April 4, 1961
L. J. COLBERT
2,978,533
CABLE SPLICE ENCLOSURE
Filed Dec. 26, 1957
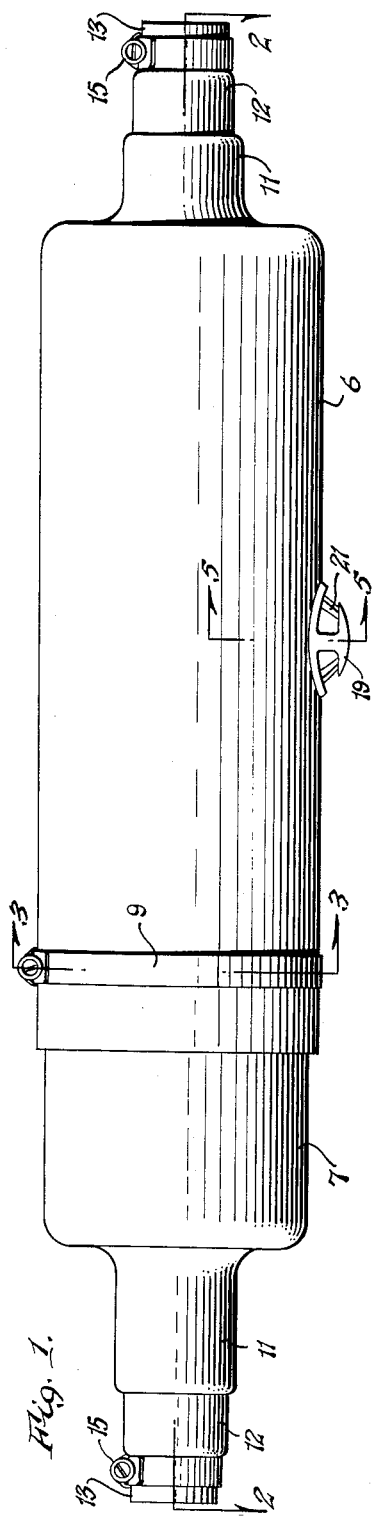
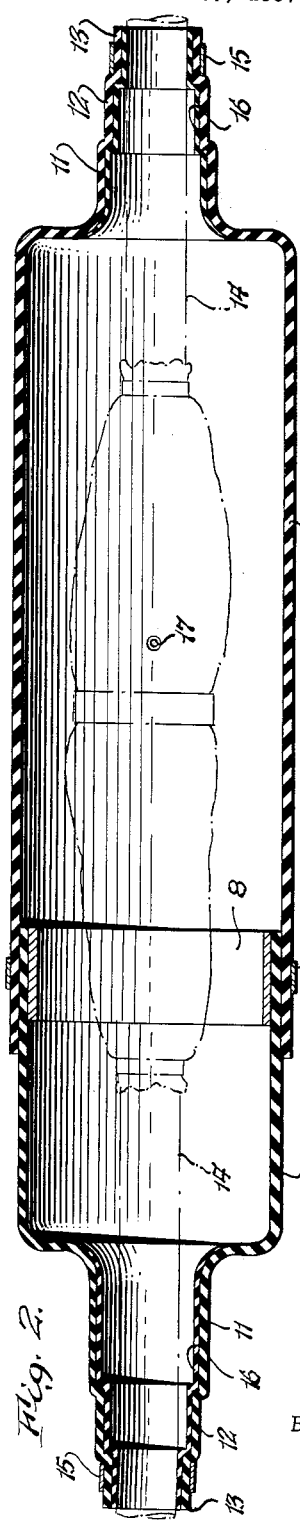
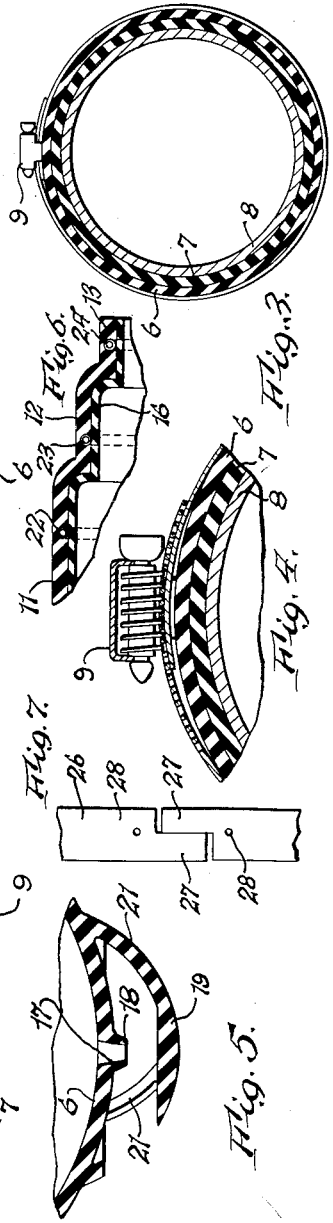
INVENTOR.
Lee J. Colbert
BY
Papp and Sommer
ATTORNEYS.

United States Patent Office 2,978,533
Patented Apr. 4, 1961

2,978,533

CABLE SPLICE ENCLOSURE

Lee J. Colbert, Snyder, N.Y., assignor to
Robertson Electric Co., Inc.

Filed Dec. 26, 1957, Ser. No. 705,240

6 Claims. (Cl. 174—93)

This invention relates to cable splice enclosures, and more particularly to a cable splice enclosure for communication lines.

The cable splice enclosure of the present invention incorporates certain novel and distinctive features which provide advantages over cable enclosures of the prior art. More particularly, the cable splice enclosure of the present invention is formed of a molded vinyl plastic and includes a suction type weep hole which assures effective draining of any moisture accumulation within the enclosure. In addition, the subject cable splice enclosure is provided with stepped necks to accommodate different size cables, and also includes integral soft plastic neck linings for sealing engagement with the enclosed cables. Another feature of the splice enclosure of the invention includes means for convenient and rapid assembly of the enclosure.

The main object of this invention is to provide a cable splice enclosure for use on communication cables, which enclosure incorporates features resulting in an improvement over enclosures of the prior art.

A more specific object of this invention is to provide a cable splice enclosure having means to effectively remove moisture condensate from within the enclosure.

Another object of this invention is to provide a cable splice enclosure having means for accommodating cables of different sizes.

Still another object of this invention is to provide a cable splice enclosure having means for effectively sealing the enclosure upon the cables entering therein.

Still another object of this invention is to provide a cable splice enclosure having means for the convenient and effective assemblage of the enclosure about a cable splice.

These and further objects and features of the invention will become more apparent from the following description and the accompanying drawing wherein:

Fig. 1 is an exterior view of a cable splice enclosure incorporating the features of the invention;

Fig. 2 is a longitudinal sectional view of the cable enclosure of Fig. 1;

Fig. 3 is a section view as seen along line 3—3 in Fig. 1;

Fig. 4 is an enlarged section view of a clamping screw used with the cable splice enclosure of Fig. 1;

Fig. 5 is a section view as seen from line 5—5 in Fig. 1;

Fig. 6 is a fragmentary sectional view of modified neck sections; and

Fig. 7 is a fragmentary plan view of a modified clamp ring.

Referring now to the drawing, a cable splice enclosure representative of an embodiment of the invention includes a cylindrical body portion 6 adapted to snugly overlap the end of a cylindrical body portion 7, the latter having a fixed diameter metal ring 8 positioned within its overlapped end providing a rigid form to receive the pressure of a screw type clamping ring 9 arranged on the outer surface of the cylindrical body portion 6. In such manner, the body portions 6 and 7 may be securely clamped between the fixed diameter ring 8 and the clamping ring 9. The body portions 6 and 7 are formed of a moldable and flexible material which has good weather resisting properties, such as vinyl plastic. The body portions 6 and 7 each have a stepped down neck portion including a maximum neck diameter section 11, an intermediate neck diameter section 12, and a minimum neck diameter section 13. In such manner the enclosure can be used with a variety of cable sizes, it being only necessary to cut off the neck diameter sections which are too small for the cables to be spliced and enclosed. In the illustration, the enclosure is shown as applied to a cable 14 having a diameter of such size as to call for utilization of the neck diameter section 13. A screw type clamp 15 is arranged upon the exterior of a neck section for clamping the latter upon the cable. A lining 16 formed of a soft plastic material, is arranged within the neck sections 11, 12 and 13, which lining serves to establish a sealing fit about the enclosed cable. A weep hole arrangement for drainage of condensate from within the enclosure, consists of an orifice 17 extending through the body portion 6, a boss 18 disposed about the orifice and on the outer surface of the body portion, and a shield 19 arranged a short distance from the boss. The shield 19 is secured to the body portion 6 by means of arms 21, the latter of which may be molded with the body portion 6 or secured thereto after the body portion has been molded. It will be seen that the shield 19 directs flow of air perpendicular to the axis of the orifice 17, thereby creating an aspiratory effect which causes a removal of the condensate from within the enclosure.

The modified neck sections illustrated in Fig. 6, comprise a plurality of helical garter springs 22, 23 and 24, which are completely embedded within the walls of the neck sections 11, 12 and 13 respectively. These springs form an integral and internal clamping means, which operate in place of the screw clamps 15, to securely maintain the end of the splice enclosure upon a cable entering the enclosure. The modified neck sections have an internal diameter slightly less than the diameter of the cable being used, or enclosed by a particular neck section, so that the spring of said section will be under tension as it encloses the cable, to thus provide a tight fit.

In Fig. 7, a portion of a self clamp ring 26, is illustrated, which clamp ring may be used in place of the clamp ring 9. The clamp ring is expandable in diameter and is adapted to have a minimum diameter less than the external diameter of the enclosure body portion 6, so that it will clamp snugly in set position upon the enclosure. The ends of the clamp ring 26 have end fingers 27 adapted to engage each other along the inner sides thereof, when the ring is in position upon the enclosure. An opening or hole 28, formed near each end of the ring, provides means whereby a spreading plier (not shown), having spaced pins in the jaws, may be inserted in the holes 28 so that the ring may be easily spread open for application or removal from the enclosure.

From the foregoing it will be seen that a cable splice enclosure incorporating the principles of the invention provides an improvement over the cable enclosures of the prior art. Among other features of the invention, the novel arrangement of the weep hole assures complete and constant drainage of moisture condensate from within the enclosure, while the stepped neck arrangement allows for the use of the enclosure with a variety of different size cables. In addition, the modifications including the integral clamping neck sections having the springs 22, 23 and 24, and the self-clamping ring 26, further contribute to the convenience and effectiveness which is afforded by the cable splice enclosure of the invention.

The foregoing description has been given in detail without thought of limitation since the inventive principles involved are capable of assuming other physical embodiments without departing from the spirit of the invention and the scope of the appended claims.

What is claimed is:

1. In a cable splice enclosure, a pair of body portions having open ends arranged in overlapped relation, each of said body portions having a stepped down neck portion including a plurality of different diameter neck sections, and a condensate removal means including a boss formed to project downwardly from the outer surface of one of the body portions and surrounding a drain hole formed therein, and a shield maintained in spaced relation below the boss by arms connecting the shield to the body portion, the surface of said shield being substantially flat and being arranged perpendicular to the axis of said hole whereby air currents are deflected to pass horizontally across the end of said boss to provide an aspirating effect on the drain hole.

2. In a cable splice enclosure, a pair of tubular body portions having open ends arranged in overlapped relation, each of said body portions having a stepped down cable embracing neck portion including a plurality of different diameter neck sections each of which has a liner of soft plastic material and an integrally arranged garter spring embedded in the section by its liner, said garter spring exerting a contracting force to urge the liner into sealing engagement with the cable, and means to hold said body portions in overlapped relation.

3. In an enclosure for a cable connection or the like having a tubular neck made of soft resilient plastic material and of progressively reduced internal diameter to fit cables of different sizes on being cut off to a predetermined length and thereby providing a selected internal diameter portion, the combination therewith of means providing a seal between said neck and cable, comprising a tubular liner for said neck made of substantially softer resilient material than the material from which said neck is made, said liner being homogeneously united to said neck and extending axially along and conforming to said progressively reduced diameter to provide soft internal annular seals for cables of different diameter.

4. The combination set forth in claim 3 additionally including a radially resilient annular spring member compressively embracing the selected portion of said liner and yieldingly holding the liner of said selected portion in compressive relation with said cable.

5. The combination set forth in claim 3 addiitonally including an annular spring member embedded between said material of said neck and said liner of said selected portion and yieldingly holding said liner at said selected portion in compressive relation with said cable.

6. The combination set forth in claim 5 wherein said annular spring is in the form of an endless, circumferentially expansible and contractable ring spring.

References Cited in the file of this patent

UNITED STATES PATENTS

| | | |
|---|---|---|
| 769,248 | Brainard | Sept. 16, 1904 |
| 992,738 | Marshall | May 16, 1911 |
| 1,620,693 | Royal | Mar. 15, 1927 |
| 2,065,315 | Keath | Dec. 22, 1936 |
| 2,594,282 | Bergeron | Apr. 29, 1952 |
| 2,595,787 | Heimann | May 6, 1952 |
| 2,635,132 | Rogoff | Apr. 14, 1953 |

FOREIGN PATENTS

| | | |
|---|---|---|
| 22,404 | Great Britain | Dec. 23, 1891 |